United States Patent
Heinen et al.

(10) Patent No.: US 6,646,030 B2
(45) Date of Patent: Nov. 11, 2003

(54) FLAME-RETARDING COMPOSITION AND PROCESS FOR THE PREPARATION THEREOF

(75) Inventors: Wouter Heinen, Maastricht (NL); Renier H. M. Kierkels, Beegden (NL)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 6 days.

(21) Appl. No.: 09/957,539

(22) Filed: Sep. 21, 2001

(65) Prior Publication Data

US 2002/0010237 A1 Jan. 24, 2002

Related U.S. Application Data

(63) Continuation of application No. PCT/NL00/00123, filed on Feb. 28, 2000.
(60) Provisional application No. 60/159,094, filed on Oct. 13, 1999.

(30) Foreign Application Priority Data

Mar. 22, 1999 (NL) .............................................. 1011631

(51) Int. Cl.$^7$ ............................ C08K 5/34; C09K 21/00
(52) U.S. Cl. ....................................... 524/100; 252/609
(58) Field of Search ........................... 524/100; 252/609

(56) References Cited

U.S. PATENT DOCUMENTS

| | | | |
|---|---|---|---|
| 5,643,980 A | * | 7/1997 | Shindoh et al. ............. 524/100 |
| 6,051,708 A | * | 4/2000 | De Keijzer et al. ......... 524/100 |

FOREIGN PATENT DOCUMENTS

| | | |
|---|---|---|
| DE | 1803606 | 6/1970 |
| DE | 1694254 | 6/1971 |
| DE | 3023965 | 2/1981 |
| DE | 242941 | 2/1987 |
| JP | 59045352 | 3/1984 |
| JP | 60144348 | 7/1985 |

* cited by examiner

*Primary Examiner*—Kriellion A. Sanders
(74) *Attorney, Agent, or Firm*—David R. Crichton

(57) ABSTRACT

Flame-retarding composition comprising
10–90 wt. % melem,
0.01–30 wt. % melam,
0.01–15 wt. % melamine,
0.1–65 wt. % higher condensation products of melamine and/or melem, the volatiles content being lower than 3 wt. % and the sum of the individual components amounting to 100 wt. %. Also a process for the preparation of a flame-retarding composition comprising 10–90 wt. % melem, 0.01–30 wt. % melam, 0.01–15 wt. % melamine and 0.1–65 wt. % higher condensation products of melamine and/or melem, the volatiles content being lower than 3 wt. %, by heating melamine-containing starting product for more than 0.1 second, for example by passing it through a heating zone, at a temperature of 350–800° C. and a pressure of between 1 KPa and 50 Mpa. The invention also relates to polymer compositions containing the flame-retarding composition.

12 Claims, No Drawings

FLAME-RETARDING COMPOSITION AND PROCESS FOR THE PREPARATION THEREOF

CROSS-REFERENCE TO RELATED APPLICATIONS

This application is the benefit of provisional application No. 60/159,094, filed Oct. 13, 1999.

This Applicaton is a continuation of International Application PCT/NL00/00123, filed Feb. 28, 2000, which designated the U.S. and was published in the English language.

The invention relates to a flame-retarding composition and a process for the preparation thereof.

A flame-retarding composition and a process for the preparation thereof are for example described in the Japanese patent publication JP 59-45352, in which the melamine condensation products melem and melon are prepared and used as flame retardants in polyamide compositions. In this publication melem is prepared by heating melamine at a temperature of 400–500° C. for several hours. Melon is prepared by heating melamine at 500–550° C. until no more ammonia is released. JP 59-45352 mentions that the decomposition temperature of melem lies above 500° C. and that of melon above 600° C. This means that melem and melon have a particularly good thermal stability. According to JP 59-45352, the nitrogen contents of both compounds lie above 60%, as a result of which the substances are non-combustible. JP 59-45352 also mentions that other known flame retardants can also be used in combination with melem or melon, for example melamine, cyanuric acid, melamine cyanurate or melam. JP 59-45352 does not mention the composition of the product obtained.

Melamine and its condensation products all have a characteristic thermal degradation curve. This means that melamine and its condensation products decompose to form nitrogen-containing products at a certain temperature. These nitrogen-containing products that are released in the thermal degradation play an important part in the flame-retardant behaviour. To obtain good flame-retardant behaviour in polymers it may be favourable to combine flame-retarding components, such as melam, melem and the higher condensation products of melamine and/or melem, having different degradation characteristics, in a single composition. The advantage of this is that, irrespective of the temperature prevailing in a fire, there will almost always be a component present that degrades at the prevailing temperature and produces sufficient nitrogen-containing components having a flame-retarding effect. However, if the flame-retarding composition contains volatile components, such as urea and/or water, this will have a negative effect on the processing properties when the composition is used in polymers with a high melting temperature, for example in polyesters such as polyethylene terephthalate (PET) or polybutylene terephthalate (PBT) or in polyamides. Such a negative effect could be foaming during extrusion or the formation of deposits on the mould in injection-moulding. If the flame-retarding composition contains too high a concentration of higher condensation products of melamine and/or melem, the composition will be yellow, which is undesirable in the case of processing in (uncoloured) polymer compositions. The use of pure melamine condensation products such as pure melam or melem or melon as a flame retardant in polymers is unfavourable because it will usually be difficult, and hence expensive, to prepare pure compounds and because pure components have only one mode of degradation and will hence work optimally only in a limited temperature range.

The applicant has discovered that excellent processing properties and excellent flame-retarding properties and colour properties can be obtained in polymer compositions by using a flame-retarding composition containing:
10–90 wt. % melem,
0.01–30 wt. % melam,
0.01–15 wt. % melamine,
0.1–65 wt. % higher condensation products of melamine and/or melem, the concentration of volatile components being lower than 3 wt. % and the sum of the individual components amounting to 100 wt. %.

The concentration of volatile components is here defined as the decrease in weight that occurs in heating the flame-retarding composition from room temperature to 300° C. in a TGA measurement (TGA=thermogravimetric analysis) at a heating rate of 200° C. per minute.

The applicant has also found a process for preparing a flame-retarding composition comprising 10–90 wt. % melem, 0.01–30 wt. % melam, 0.01–15 wt. % melamine, 0.1–65 wt. % higher condensation products of melamine and/or melem, the concentration of volatile components being lower than 3 wt. % and the sum of the individual components amounting to 100 wt. %, by heating a starting product containing melamine, for example by passing it through a heating zone, for longer than 0.1 sec., preferably 1 sec. to 400 minutes, in particular 2 sec. to 300 minutes, at a temperature of 350–800° C., preferably between 375 and 600° C. and at a pressure between 1 KPa and 50 MPa, preferably between atmospheric pressure and 30 MPa, more in particular between atmospheric pressure and 15 Mpa.

Examples of heating zones are heating zones of the kind that are to be found in extruders, such as single- and twin-screw extruders; autoclaves; turbo mixers; plough blade mixers; tumble mixers; turbulence mixers; ribbon-blade mixers; mixtruders; continuous and discontinuous kneading machines; rotating drum ovens, etc.

A mixture of melamine, melem, melam and higher condensation products of melamine and/or melem can optionally be obtained by treating the product of the heating further, to obtain a flame-retarding composition comprising 10–90 wt. % melem, 0.01–30 wt. % melam, 0.01–10 wt. % melamine, 0.1–65 wt. % higher condensation products of melamine and/or melem, the concentration of volatile components being lower than 1 wt. % and the sum of the individual components amounting to 100 wt. %. This further treatment is preferably washing with water to dissolve and remove from the flame-retarding composition a portion of the melamine and/or other water-soluble components.

As the starting material for the present process, use can be made of virtually pure melamine, as for example obtained from a continuously operating gas-phase melamine plant where the melamine is purified by means of crystallisation. A method for the preparation of melamine via a gas-phase process is for example known from U.S. Pat. No. 3,210,352. This high degree of purity is however not necessary. Melamine contaminated with melam and/or melem and/or higher condensation products of melamine and/or melem can optionally be used as the starting material, for example the product that is formed during start-up of a melamine plant or melamine of the kind that is prepared in a gas-phase melamine plant before purification by means of crystallisation has taken place or melamine contaminated with melam and/or melem and/or higher condensation products of melamine and/or melem formed in some other way. It is also possible to use melamine obtained in a liquid-phase process as the starting material. A known process for the preparation of melamine via a liquid-phase process is described in U.S.

Pat. No. 4,565,867, of which it is known that the degree of purity is less than that of the product of a gas-phase process; in particular, its melam content is higher. Contaminants like residual catalyst, ureidomelamine and/or guanidine carbonate may also be present without any objection. Oxygen-containing triazine compounds such as ammeline, ammelide and/or cyanuric acid may also be present up to 5 wt. % without any objection. Remains of the starting materials used for the preparation of melamine, such as urea and/or dicyanodiamide, may also be present; dicyanodiamide may be present up to 10 wt. % without any objection, while the melamine may contain up to 30 wt. % urea. The starting material for the present process may also contain contaminants containing mixtures of urea, oxygen-containing triazine compounds, dicyanodiamide, guanidine carbonate, ureidomelamine and residual catalyst.

In a preferred embodiment of the invention the flame-retarding composition is prepared by heating the melamine-containing starting product in an autoclave or in an extruder. Preferably at a pressure between atmospheric pressure and 20 Mpa, at a temperature of 350–625° C. and with a residence time of between 0.1 sec. and 360 minutes. More in particular the heating of the melamine-containing starting product is carried out in an extruder with a residence time in the extruder of between 0.1 sec. and 60 minutes.

The invention also relates to flame-retarding polymer compositions comprising the following components:

a. 65–95 wt. % polymer-containing composition
b. 5–35 wt. % flame-retarding composition according to the invention The flame-retarding composition according to the invention is particularly suitable for use in polymer compositions requiring heat-resistant flame retardants, for example in polyamides, polyimides, polyesters, styrene-containing polymers, epoxy resins, unsaturated polyester resins and polyurethanes.

Examples of polyamides are polyamides and copolyamides derived from diamines and dicarboxylic acids and/or from aminocarboxylic acids or the corresponding lactams, such as polyamide 4, polyamide 6, polyamides 6/6, 6/10, 6/9, 6/12, 4/6, 66/6, 6/66, polyamide 11, polyamide 12, partially aromatic (co)polyamides, for example polyamides based on an aromatic diamine and adipic acid; polyamides prepared from an alkylene diamine and iso- and/or terephthalic acid and copolyamides thereof, copolyether amides, copolyester amides, etc.

Examples of polyesters are polyesters derived from dicarboxylic acids and dialcohols and/or from hydroxycarboxylic acids or the corresponding lactones such as polyethylene terephthalate, polybutylene terephthalate, poly-1,4-dimethylolcyclohexane terephthalate, polyhydroxybenzoates, polycaprolactone and copolyesters thereof, copolyether esters, etc.

Examples of styrene-containing polymers are polystyrene, acrylonitrile-styrene copolymer, acrylonitrile-styrene-butadiene copolymers and mixtures hereof.

Preferably the flame-retarding composition is used in polyesters such as polyethylene terephthalate and/or polybutylene terephthalate, polybutylene terephthalate being particularly preferable, or in polyamides such as nylon-6, nylon 6,6 or nylon 4,6.

"Polymer-containing compositions" are understood to be compositions which, in addition to polymer, may also contain reinforcing agents and/or fillers, compounds that have a synergetic effect with the flame-retarding composition, other flame-retarding components than those according to the invention, plus the usual additives.

If reinforcing agents and/or fillers are used in the polymer composition of the invention, their concentration may vary within a wide range, partly determined by the level of mechanical properties one wishes to achieve. In general, the concentration of reinforcing agents will be no more than 50 wt. % in the reinforced flame-retarding polymer composition. Preferably the reinforced flame-retarding polymer composition will contain 5–50 wt. % reinforcing agents, more preferably 15–45 wt. %. The reinforcing agents can be chosen from the group comprising inorganic reinforcing agents, such as mica, clay, talc or glass fibres, or aramide fibres and/or carbon fibres. Glass fibres are however preferable.

The flame-retarding effect of the flame-retarding composition according to the invention can be reinforced by the presence of a compound that has a synergetic effect with the flame-retarding composition, such as a carbon-forming compound, whether or not combined with a catalyst promoting the formation of carbon. In general the concentration of the flame-retarding composition can then be chosen to be lower.

In principle, all the known substances that reinforce the effect of flame-retarding compositions can be used as carbon-forming compounds. Examples are phenolic resins, epoxy resins, melamine resins, alkyd resins, allyl resins, unsaturated polyester resins, silicone resins, urethane resins, acrylate resins, polyphenylene ether, polycarbonate, starch, glucose and compounds containing at least two hydroxyl groups. Examples of compounds containing at least two hydroxyl groups are alcohols containing at least two hydroxyl groups, for example pentaerythritol, dipentaerythritol, tripentaerythritol and mixtures hereof. The concentration of the carbon-forming compound having a synergetic effect with the flame retardant in the overall polymer composition will generally lie between 0 and 30 wt. %, preferably between 1 and 20 wt. %.

As the catalyst promoting the formation of carbon use can for example be made of metal salts of tungstic acid; a complex acid oxide of tungsten with a metalloid; salts of tin oxide; ammonium sulphamate and/or the dimer hereof. Metal salts of tungstic acid are preferably alkali metal salts of tungstic acid, in particular sodium tungstate. A "complex acid oxide of tungsten with a metalloid" is understood to be complex acid oxides which are formed from a metalloid such as silicon or phosphorus and tungsten, such as silicotungstic acid or phosphorotungstic acid. The amount of catalyst promoting the formation of carbon that is used in the overall polymer composition is 0.1–5 wt %, preferably 0.1–2.5 wt %.

The flame-retarding effect of the flame-retarding composition according to the invention can be further reinforced by using one or more other flame-retarding components. In principle, all the known flame retardants can be used as the other flame-retarding components. Examples are antimony oxide, for example antimony trioxide, combined with halogen compounds; alkali earth metal oxides, for example zinc oxide, magnesium oxide; other metal oxides, for example alumina, silica, iron oxide and manganese oxide; metal hydroxides, for example magnesium hydroxide and aluminium hydroxide; metal borates, for example zinc borate, whether or not hydrated; and phosphorus-containing compounds. Examples of phosphorus-containing compounds are zinc phosphate, ammonium phosphate, ammonium pyrophosphate, ammonium polyphosphate, ethylenediamine phosphate, piperazine phosphate, piperazine pyrophosphate, melamine phosphate, dimelamine phosphate, melamine pyrophosphate, melamine polyphosphate, melam phosphate, melam pyrophosphate, melam polyphosphate, melem phosphate, melem pyrophosphate, melem polyphosphate, guanidine phosphate, dicyanodiamide phosphate, urea phosphate and phosphates, pyrophosphates and polyphosphates of higher condensation products of melamine and/or melem and mixtures of these phosphates. The acids, salts, mixed acid salts, esters, partial esters and mixed esters of phosphates can also be used. Use may also be made of phosphine oxides, phosphine sulphides and phosphorinanes and of phosphonates, phosphites and phosphinates and of their acids, salts, mixed acid salts, esters, partial esters and mixed esters. The concentration of other flame-retarding components that can be used may vary within a wide range but will generally not be higher than the concentration of flame-retarding composition according to the invention. Preferably the amount will be between 0 and 35 wt. %, more in particular 1 and 20 wt. %. Preferably use is made of phosphates, phosphinates and phosphonates. Examples of such compounds are for example described in Kirk Othmer, Encyclopedia of Chemical Technology, Volume 10, pp. 396–419 (1980). Well-known examples are: the esters of trimethylol propane and methyl phosphonic acid, ethyl-methyl phosphinic acid and the aluminium salt of ethyl-methyl phosphinic acid. Many of the compounds mentioned here may also promote the formation of carbon. Other known compounds present in flame-retarding compositions such as polytetrafluoroethylene may also be present.

The polymer composition may also contain the other usual additives, such as heat and UV stabilisers, mould-release agents, plasticisers, softeners, lubricants, dispersing agents, colourants and/or pigments, in amounts generally used for these additives insofar as the properties are not adversely affected.

The polymer composition according to the invention can be prepared using the conventional techniques known per se, by for example mixing all or some of the components in dry condition in a tumble mixer, followed by melting in a melt mixer, for example a Brabender mixer or a single- or twin-screw extruder or a kneading machine. Preferably a twin-screw extruder is used.

The various components of the polymer composition of the invention may be dosed to the extruder's throat together. They may also be dosed to the extruder in different places. Some of the components, for example colourants, stabilisers, the flame-retarding composition, compounds having a synergetic effect with the flame-retarding composition and/or other flame-retarding components may for example be added to the polymer in the form of a master-batch.

The polymer composition according to the invention can be processed into semi-finished products or end products using techniques known to a person skilled in the art, for example injection-moulding.

The invention will be further elucidated with reference to the following examples:

COMPARATIVE EXAMPLE A

Melamine (product of a gas-phase process from DSM) was dosed to a corotating twin-screw extruder (Werder & Pfleiderer, type ZSK 30/33) at a rate of 3 kg per hour. The cylinder temperature had been set to 330° C. and the screw speed to 40 rpm. The residence time of the components dosed to the extruder was 115 seconds. The solid mixture leaving the extruder was white and had the following composition: 88 wt. % melamine, 6 wt. % melan, 2 wt. % melem and 4 wt. % higher condensation products of melamine and/or melem. The volatiles content is 1.6 wt. %. The composition of the flame-retarding composition was determined with the aid of high-pressure liquid chromatography (HPLC). The values obtained have a relative error of 5% or less.

EXAMPLE 1

Melamine (product of a gas-phase process from DSM) was dosed to a corotating twin-screw extruder (Werder & Pfleiderer, type ZSK 30/33) at a rate of 1 kg per hour. The cylinder temperature had been set to 400° C. and the screw speed to 40 rpm. The residence time of the components dosed to the extruder was approximately 95 seconds. The solid mixture leaving the extruder was white to pale beige and had the following composition: 8 wt. % melamine, 0.5 wt. % melam, 73 wt. % melem and 18.5 wt. % higher condensation products of melamine and/or melem. The volatiles content is 0.4 wt. %. The composition of the flame-retarding composition was determined with the aid of high-pressure liquid chromatography (HPLC).

EXAMPLE 2

Melamine (product of a gas-phase process from DSM) was dosed to a corotating twin-screw extruder (Werder & Pfleiderer, type ZSK 30/33) at a rate of 2 kg per hour. The cylinder temperature had been set to 450° C. and the screw speed to 40 rpm. The residence time of the components dosed to the extruder was approximately 100 seconds. The solid mixture leaving the extruder was white to pale beige and had the following composition: 1.3 wt. % melamine, 0.1 wt. % melam, 64 wt. % melem and 23.7 wt. % higher condensation products of melamine and/or melem. The volatiles content is 0.1 wt. %. The composition of the flame-retarding composition was determined with the aid of high-pressure liquid chromatography (HPLC).

EXAMPLE 3

Melamine (product of a gas-phase process from DSM) was dosed to a corotating twin-screw extruder (Werder & Pfleiderer, type ZSK 30/33) at a rate of 3 kg per hour. The cylinder temperature had been set to 450° C. and the screw speed to 40 rpm. The residence time of the components dosed to the extruder was 80 seconds. The solid mixture leaving the extruder was white to pale beige and had the following composition: 1 wt. % melamine, 0.1 wt. % melam, 86 wt. % melem and 12.9 wt. % higher condensation products of melamine and/or melem. The volatiles content is 0.2 wt. %. The composition of the flame-retarding composition was determined with the aid of high-pressure liquid chromatography (HPLC).

EXAMPLE 4

1008 grams (8 mol) of melamine was introduced into an autoclave with a volume of about 2000 ml. The stirrer was started at a speed of approx. 30 rpm. The reactor was then brought to the required temperature. The reaction temperature was 500° C. The ammonia pressure in the autoclave, which was built up during the reaction, was kept at approx. 2 Mpa with the aid of a control valve. The reaction time was 60 minutes. The autoclave was then cooled. The pressure in the autoclave was maintained during the cooling. The ammonia pressure was relieved as soon as the temperature dropped below 200° C. The solid mixture leaving the autoclave was white to pale beige and had the following composition: 0.4 wt. % melamine, 0.5 wt. % melam, 91 wt. % melem and 8 wt. % higher condensation products of melamine and/or melem. The volatiles content was 0.1 wt. %. The composition of the flame-retarding composition was determined with the aid of high-pressure liquid chromatography (HPLC).

EXAMPLE 5

A corotating twin-screw extruder (Werder & Pfleiderer, type ZSK 30/33) was fed with: 45 parts polybutylene terephthalate, 30 parts glass fibre, 15 parts ground product of Example 2 and 10 parts Antiblaze® 1045 (cyclic phosphonate ester from Albright&Wilson). The cylinder temperature had been set to 250° C. and the screw speed to 200 rpm. Specimens with a thickness of 1.6 mm were produced from the compound obtained and tested. The burning behaviour according to UL 94 was V-0. The modulus of elasticity was 10.1 GPa and the elongation at break was 2.0% (ISO 527/1).

EXAMPLE 6

A corotating twin-screw extruder (Werder & Pfleiderer, type ZSK 30/33) was fed with: 45 parts polybutylene terephthalate, 30 parts glass fibre, 15 parts ground product of Example 3 and 10 parts Antiblaze® 1045 (cyclic phosphonate ester from Albright&Wilson). The cylinder temperature had been set to 250° C. and the screw speed to 200 rpm. Specimens with a thickness of 1.6 mm were produced from the compound obtained and tested. The burning behaviour according to UL 94 was V-0. The modulus of elasticity was 10.0 GPa and the elongation at break was 2.0% (ISO 527/1).

EXAMPLE 7

A corotating twin-screw extruder (Werder & Pfleiderer, type ZSK 30/33) was fed with: 45 parts polybutylene terephthalate, 30 parts glass fibre, 15 parts ground product of Example 4 and 10 parts Antiblaze® 1045 (cyclic phosphonate ester from Albright&Wilson). The cylinder temperature had been set to 250° C. and the screw speed to 200 rpm. Specimens with a thickness of 1.6 mm were produced from the compound obtained and tested. The burning behaviour according to UL 94 was V-0. The modulus of elasticity was 10.2 GPa and the elongation at break was 2.1% (ISO 527/1).

EXAMPLE 8

A corotating twin-screw extruder (Werder & Pfleiderer, type ZSK 30/33) was fed with: 45 parts polyamide 6, 20 parts glass fibre, 30 parts ground product of Example 4 and 5 parts Antiblaze® 1045 (cyclic phosphonate ester from Albright&Wilson). The cylinder temperature had been set to 250° C. and the screw speed to 200 rpm. Specimens with a thickness of 1.6 mm were produced from the compound obtained and tested. The burning behaviour according to UL 94 was V-0. The modulus of elasticity was 11.2 GPa and the elongation at break was 2.0% (ISO 527/1).

EXAMPLE 9

A corotating twin-screw extruder (Werder & Pfleiderer, type ZSK 25/38) was fed with: 80 parts polyamide 4, 6 and 20 parts ground product of Example 3. The cylinder temperature had been set to 300–315° C. and the screw speed to 270 rpm. Specimens with a thickness of 1.6 mm were produced from the compound obtained and tested. The burning behaviour according to UL 94 was V-0. The modulus of elasticity was 3.6 GPa and the elongation at break was approximately 25% (ISO 527/1).

EXAMPLE 10

A corotating twin-screw extruder (Werder & Pfleiderer, type ZSK 25/38) was fed with: 90 parts polyamide 4, 6 and 10 parts ground product of Example 3. The cylinder temperature had been set to 300–315° C. and the screw speed to 270 rpm. Specimens with a thickness of 1.6 mm were produced from the compound obtained and tested. The burning behaviour according to UL 94 was V-0. The modulus of elasticity was 2.3 GPa and the elongation at break was 30% (ISO 527/1).

EXAMPLE 11

A corotating twin-screw extruder (Werder & Pfleiderer, type ZSK 30/33) was fed with: 80 parts polyamide 6, 6 and 20 parts ground product of Example 3. The cylinder temperature had been set to 270–280° C. and the screw speed to 200 rpm. Specimens with a thickness of 1.6 mm were produced from the compound obtained and tested. The burning behaviour according to UL 94 was V-0.

EXAMPLE 12

A corotating twin-screw extruder (Werder & Pfleiderer, type ZSK 30/33) was fed with: 80 parts acrylonitrile-butadiene-styrene (Ronfalin® from DSM containing 20 parts rubber) and 20 parts ground product of Example 3. The cylinder temperature had been set to 180–210° C. and the screw speed to 200 rpm. Specimens with a thickness of 1.6 mm were produced from the compound obtained and tested. The burning behaviour according to UL 94 was V-0.

EXAMPLE 13

A mixture of 98.0% melamine, 0.81% urea, 0.03% $CO_2$, 0.05% ammeline-related impurities (such as ammeline, ammelide, cyanuric acid and uridomelamine) and 0.07% organic solids (melem, melam and other oxygen-free compounds), as obtained in the process according to U.S. Pat. No. 4,565,867, was dosed to a corotating twin-screw extruder (Werder & Pfleiderer, type ZSK 30/33) at a rate of 8 kg per hour. The cylinder speed had been set to 450° C. and the screw speed to 40 rpm. The residence time of the components dosed to the extruder was 110 seconds. The solid mixture leaving the extruder was white to pale beige and had the following composition: 7 wt. % melamine, 2 wt % melam, 76 wt. % melem, 14 wt. % higher condensation products of melamine and/or melem, and an unidentified residual fraction of approx. 1 wt. % The volatiles content is 0.2 wt. %. The composition of the flame-retarding composition was determined with the aid of high-pressure liquid chromatography (HPLC).

EXAMPLE 14

A corotating twin-screw extruder (Werder & Pfleiderer, type ZSK 30/33) was fed with: 45 parts polybutylene terephthalate, 30 parts glass fibre, 15 parts ground product of Example 13 and 10 parts Antiblaze® 1045 (cyclic phosphonate ester from Albright&Wilson). The cylinder temperature had been set to 250° C. and the screw speed to 200 rpm. Specimens with a thickness of 1.6 mm were produced from the compound obtained and tested. The burning behaviour according to UL 94 was V-0. The modulus of elasticity was 10.0 GPa and the elongation at break was 2.4% (Iso 527/1).

EXAMPLE 15

Melamine with a purity of 99.92% as obtained in the process according to U.S. Pat. No. 3,210,352 was dosed to a corotating twin-screw extruder (Werder & Pfleiderer, type ZSK 30/33) at a rate of 8 kg per hour. The cylinder speed had been set to 450° C. and the screw speed to 40 rpm. The residence time of the components dosed to the extruder was 110 seconds. The solid mixture leaving the extruder was white to pale beige and had the following composition: 6 wt. % melamine, 1 wt % melam, 77 wt. % melem, 16 wt. % higher condensation products of melamine and/or melem. The volatiles content is 0.3 wt. %. The composition of the flame-retarding composition was determined with the aid of high-pressure liquid chromatography (HPLC).

EXAMPLE 16

A corotating twin-screw extruder (Werder & Pfleiderer, type ZSK 30/33) was fed with: 45 parts polybutylene terephthalate, 30 parts glass fibre, 15 parts ground product of Example 15 and 10 parts Antiblaze® 1045 (cyclic phosphonate ester from Albright&Wilson). The cylinder temperature had been set to 250° C. and the screw speed to 200 rpm. Specimens with a thickness of 1.6 mm were produced from the compound obtained and tested. The burning behaviour according to UL 94 was V-0. The modulus of elasticity was 10.5 Mpa and the elongation at break was 2.2% (Iso 527/1).

EXAMPLE 17

A mixture of 98.7% melamine, 1.0% urea, 0.06% $CO_2$, 0.1% ammeline-related compounds (such as ammeline, ammelide and cyanuric acid) and 0.12% organic solids (melem, melam and other compounds) and 0.02% (200 ppm) residual inorganic catalyst, as obtained after the quenching and before the crystallisation step according to the process described in U.S. Pat. No. 3,210,352, was dosed to a corotating twin-screw extruder (Werder & Pfleiderer, type ZSK 30/33) at a rate of 8 kg per hour. The cylinder speed had been set to 450° C. and the screw speed to 40 rpm. The residence time of the components dosed to the extruder was 110 seconds. The solid mixture leaving the extruder was white to pale beige and had the following composition: 6 wt. % melamine, 1 wt % melam, 74 wt. % melem, 20 wt. % higher condensation products of melamine and/or melem. The volatiles content is 0.3 wt. %. The composition of the flame-retarding composition was determined with the aid of high-pressure liquid chromatography (HPLC).

EXAMPLE 18

A corotating twin-screw extruder (Werder & Pfleiderer, type ZSK 30/33) was fed with: 45 parts polybutylene terephthalate, 30 parts glass fibre, 15 parts ground product of Example 17 and 10 parts Antiblaze® 1045 (cyclic phosphonate ester from Albright&Wilson). The cylinder temperature had been set to 250° C. and the screw speed to 200 rpm. Specimens with a thickness of 1.6 mm were produced from the compound obtained and tested. The burning behaviour according to UL 94 was V-0. The modulus of elasticity was 10.2 GPa and the elongation at break was 2.0% (Iso 527/1).

EXAMPLE 19

Melamine (product of a gas-phase process from DSM) was dosed to a corotating twin-screw extruder (Werder & Pfleiderer, type ZSK 30/33) at a rate of 1 kg per hour. The cylinder temperature had been set to 400° C. and the screw speed to 40 rpm. The residence time of the components dosed to the extruder was 95 seconds. The solid mixture leaving the extruder was ground. The ground product was washed in portions of about 200 grams in 3 litres of water of approximately 90° C. After 15 minutes the hot slurry was removed through filtration. The residue was treated three more times according to the same procedure. The washed product was ultimately dried at 120° C. in a vacuum drying oven until it contained less than 1 wt. % water. The product thus obtained was white and had the following composition: 1 wt. % melamine, 2 wt. % melam, 77 wt. % melem and 20 wt. % higher condensation products of melamine and/or melem. The volatiles content is less than 0.3 wt. %. The composition of the flame-retarding composition was determined with the aid of high-pressure liquid chromatography (HPLC).

What is claimed is:

1. Flame-retarding composition comprising
10–90 wt. % melem,
0.01–30 wt. % melam,
0.01–15 wt. % melamine,
0.1–65 wt. % higher condensation products of melamine, melem, or the mixtures thereof,
the volatiles content being lower than 3 wt. % and the sum of the individual components amounting to 100 wt. %.

2. Process for the preparation of a flame-retarding composition comprising 10–90 wt. % melem, 0.01–30 wt. % melam, 0.01–15 wt. % melamine, 0.1–65 wt. % higher condensation products of melamine, melem, or mixtures thereof, the volatiles content being lower than 3 wt. % and the sum of the individual components amounting to 100 wt. %, comprising:

heating a melamine-containing starting product for more than 0.1 sec. at a temperature of 350–800° C. and at a pressure of between 1 KPa and 50 MPa.

3. The process according to claim 2, wherein the melamine-containing starting product is heated in an autoclave or extruder.

4. The process according to claim 3, wherein the melamine-containing starting product is heated in an extruder with a residence time in the extruder of between 0.1 sec and 60 minutes.

5. The process according to claim 2, further comprising subsequently washing the flame-retardant composition with water, causing a portion of the melamine and any other water-soluble components to dissolve and be removed from the flame-retarding composition.

6. The process according to claim 2, wherein the starting product is melamine contaminated with at least one compound selected from melam, melem, or higher condensation products of melamine, melem or mixtures thereof.

7. The process according to claim 2, wherein the starting product is the product formed during the start-up of a melamine plant or melamine as prepared in a gas-phase plant before any crystallisation has taken place.

8. The process according to claim 2, wherein the starting product is melamine obtained via a liquid-phase process.

9. Flame-retarding polymer composition comprising the following components:
a. 65–95 wt. % polymer-containing composition
b. 5–35 wt. % flame-retarding composition according to claim 1.

10. Flame-retarding polymer composition according to claim 9, wherein the composition also comprises reinforcing fibres.

11. An article of manufacture comprising the flame-retarding composition according to claim 1.

12. An article of manufacture comprising the flame-retarding composition obtained according the process of claim 2.

* * * * *